(12) United States Patent
Kim et al.

(10) Patent No.: US 11,964,650 B2
(45) Date of Patent: Apr. 23, 2024

(54) APPARATUS AND METHOD FOR CONTROLLING VEHICLE

(71) Applicant: Samsung Electronics Co., Ltd., Suwon-si (KR)

(72) Inventors: Jong-Sok Kim, Hwaseong-si (KR); Byung Kwan Kim, Suwon-si (KR); Woosuk Kim, Hwaseong-si (KR); Min Sung Eo, Anyang-si (KR); Hyunwoong Cho, Seoul (KR); Sungdo Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/317,340

(22) Filed: May 15, 2023

(65) Prior Publication Data

US 2023/0278542 A1  Sep. 7, 2023

Related U.S. Application Data

(63) Continuation of application No. 16/990,206, filed on Aug. 11, 2020, now Pat. No. 11,685,365.

(30) Foreign Application Priority Data

Sep. 23, 2019 (KR) .................. 10-2019-0116689

(51) Int. Cl.
*B60W 30/00* (2006.01)
*B60W 30/02* (2012.01)
(Continued)

(52) U.S. Cl.
CPC ............ *B60W 30/02* (2013.01); *B60W 40/08* (2013.01); *G01S 13/89* (2013.01); *G06F 3/017* (2013.01);
(Continued)

(58) Field of Classification Search
None
See application file for complete search history.

(56) References Cited

U.S. PATENT DOCUMENTS 8,831,826 B2    9/2014  Ricci
8,866,781 B2 *  10/2014 Li .......................... G06F 3/017
                                                345/173
(Continued)

FOREIGN PATENT DOCUMENTS

JP       2019-506763 A    3/2019
KR       10-1637670 B1    7/2016
(Continued)

OTHER PUBLICATIONS

Ben-Dor, Eshar, et al., "Millimeter-wave 60 GHz Outdoor and Vehicle AOA Propagation Measurements using a Broadband Channel Sounder," *Proceedings of the 2011 IEEE Global Telecommunications Conference (GLOBECOM 2011)*, pp. 1-6, conference held Dec. 5-9, 2011, Houston, Texas, paper presented on Dec. 6, 2011.
(Continued)

*Primary Examiner* — Jonathan M Dager
(74) *Attorney, Agent, or Firm* — NSIP Law

(57) ABSTRACT

A control apparatus includes a Wi-Fi communication module, a processor, a controller that controls a component of a vehicle, and a memory, wherein the memory stores at least one piece of position information corresponding to a position in the vehicle, and at least one registered pattern of a gesture, face, or shape, the Wi-Fi communication module transmits a transmission signal to the position corresponding to the at least one piece of position information by a Wi-Fi communication method at a preset frequency and receives a reflection signal reflected from an object in response to the transmission signal, the processor acquires an input pattern of a gesture, face, or shape of the object by analyzing the reflection signal, and retrieves a registered pattern matching
(Continued)

the input pattern from the at least one registered pattern, and the controller controls the component according to an instruction corresponding to the retrieved registered pattern.

20 Claims, 5 Drawing Sheets

(51) Int. Cl.
  *B60W 40/08* (2012.01)
  *G01S 13/89* (2006.01)
  *G06F 3/01* (2006.01)
(52) U.S. Cl.
  CPC ............. *B60W 2040/0809* (2013.01); *B60W 2040/0872* (2013.01); *B60W 2420/40* (2013.01); *B60W 2420/42* (2013.01); *B60W 2540/221* (2020.02); *B60W 2540/225* (2020.02); *B60W 2540/227* (2020.02); *B60W 2556/45* (2020.02)

(56) References Cited

U.S. PATENT DOCUMENTS

| | | | |
|---|---|---|---|
| 9,292,093 B2* | 3/2016 | Iao | G01C 21/3664 |
| 9,330,306 B2* | 5/2016 | Stanek | G06F 3/017 |
| 9,475,389 B1* | 10/2016 | Fung | B60K 37/06 |
| 9,580,081 B2* | 2/2017 | George-Svahn | B60W 50/10 |
| 9,616,809 B1* | 4/2017 | Alasry | G08G 1/167 |
| 9,811,164 B2 | 11/2017 | Poupyrev | |
| 10,009,581 B2 | 6/2018 | Proud | |
| 10,241,581 B2 | 3/2019 | Lien et al. | |
| 10,401,960 B2* | 9/2019 | Khalid | G06T 19/20 |
| 10,468,022 B2* | 11/2019 | Min | G06F 3/167 |
| 10,671,071 B2* | 6/2020 | Jang | B60K 31/00 |
| 10,698,497 B2* | 6/2020 | Brennan | G06V 40/28 |
| 10,882,398 B2* | 1/2021 | Cordell | G06V 20/597 |
| 10,908,929 B2* | 2/2021 | Lu | G06F 9/451 |
| 10,913,463 B2* | 2/2021 | Herz | B60Q 1/34 |
| 11,275,147 B1* | 3/2022 | Kalkunte | G01S 13/86 |
| 11,467,672 B2* | 10/2022 | Sachidanandam | G06F 3/011 |
| 2011/0169625 A1* | 7/2011 | James | B60W 30/095 |
| | | | 340/439 |
| 2013/0024047 A1* | 1/2013 | Kalhous | G06F 3/013 |
| | | | 701/1 |
| 2013/0151031 A1* | 6/2013 | Ricci | G08G 1/143 |
| | | | 701/1 |
| 2013/0211843 A1* | 8/2013 | Clarkson | G06F 3/017 |
| | | | 704/275 |
| 2014/0148988 A1* | 5/2014 | Lathrop | B60W 30/182 |
| | | | 701/1 |
| 2014/0258942 A1* | 9/2014 | Kutliroff | G06F 3/0488 |
| | | | 715/863 |
| 2014/0309871 A1* | 10/2014 | Ricci | H04W 36/34 |
| | | | 701/36 |
| 2014/0354539 A1* | 12/2014 | Skogo | G06F 3/013 |
| | | | 345/156 |
| 2014/0361971 A1* | 12/2014 | Sala | G06F 3/013 |
| | | | 345/156 |
| 2015/0097798 A1* | 4/2015 | Ricci | B60R 21/01512 |
| | | | 345/173 |
| 2015/0234459 A1* | 8/2015 | George-Svahn | B60W 50/10 |
| | | | 345/156 |
| 2015/0367859 A1* | 12/2015 | Roth | H04W 4/16 |
| | | | 701/36 |
| 2016/0041617 A1* | 2/2016 | Poupyrev | G01S 13/04 |
| | | | 345/156 |
| 2016/0041618 A1* | 2/2016 | Poupyrev | G01S 7/415 |
| | | | 342/61 |
| 2016/0103499 A1* | 4/2016 | Yamamoto | G06F 3/04883 |
| | | | 345/156 |
| 2016/0167648 A1* | 6/2016 | James | B60Q 1/547 |
| | | | 701/28 |
| 2016/0198129 A1 | 7/2016 | Proud | |
| 2016/0210504 A1* | 7/2016 | Kim | G06F 3/017 |
| 2016/0306606 A1* | 10/2016 | Ko | G06F 3/0488 |
| 2016/0320835 A1* | 11/2016 | Kuehne | G06F 3/013 |
| 2016/0320853 A1* | 11/2016 | Lien | G06F 3/011 |
| 2017/0060254 A1* | 3/2017 | Molchanov | G06N 3/082 |
| 2017/0068322 A1* | 3/2017 | Steinberg | G06F 3/0304 |
| 2017/0282930 A1* | 10/2017 | Kochhar | B60W 50/0097 |
| 2017/0300120 A1* | 10/2017 | Tendyck | G06F 3/017 |
| 2018/0046255 A1* | 2/2018 | Rothera | B60K 35/00 |
| 2018/0191072 A1 | 7/2018 | Apostolos et al. | |
| 2018/0253151 A1* | 9/2018 | Kletsov | A61B 5/004 |
| 2018/0288232 A1 | 10/2018 | MacNeille et al. | |
| 2018/0367945 A1 | 12/2018 | Renaldi et al. | |
| 2019/0011989 A1* | 1/2019 | Schwesig | A63F 13/21 |
| 2019/0118834 A1* | 4/2019 | Wiebel-Herboth | G08G 1/166 |
| 2019/0156134 A1* | 5/2019 | Krishnan | G06N 5/04 |
| 2019/0171211 A1* | 6/2019 | Jang | B60W 60/00 |
| 2019/0174279 A1 | 6/2019 | Verma et al. | |
| 2019/0210615 A1* | 7/2019 | Caron | B60W 40/08 |
| 2019/0219997 A1* | 7/2019 | Benda | G05D 1/0016 |
| 2019/0302895 A1* | 10/2019 | Jiang | G06F 3/016 |
| 2019/0359060 A1* | 11/2019 | Satam | B60K 20/08 |
| 2020/0073480 A1* | 3/2020 | Hof | G06F 3/04847 |
| 2020/0142495 A1* | 5/2020 | Steinberg | G06V 40/18 |
| 2020/0184238 A1* | 6/2020 | Kobayashi | G06V 40/161 |
| 2020/0219338 A1* | 7/2020 | Chen | B60R 25/002 |
| 2020/0271747 A1* | 8/2020 | Wu | G01P 15/18 |
| 2021/0061277 A1* | 3/2021 | Zhang | B60W 30/0953 |
| 2021/0191521 A1* | 6/2021 | Yamamoto | G06V 20/59 |
| 2021/0368308 A1* | 11/2021 | Katardjiev | H04L 67/131 |
| 2021/0380139 A1* | 12/2021 | Taveira | G06V 40/28 |
| 2022/0066566 A1* | 3/2022 | Choi | G06F 18/22 |

FOREIGN PATENT DOCUMENTS

| | | |
|---|---|---|
| KR | 10-2018-0056059 A | 5/2018 |
| KR | 10-2019-0027657 A | 3/2019 |
| WO | WO 2018/195671 A1 | 11/2018 |

OTHER PUBLICATIONS

Lien, Jamie, et al., "Soli: Ubiquitous Gesture Sensing with Millimeter Wave Radar," *ACM Transactions on Graphics*, vol. 35, Issue 4, Jul. 2016, Article No. 142, 19 pages.

* cited by examiner

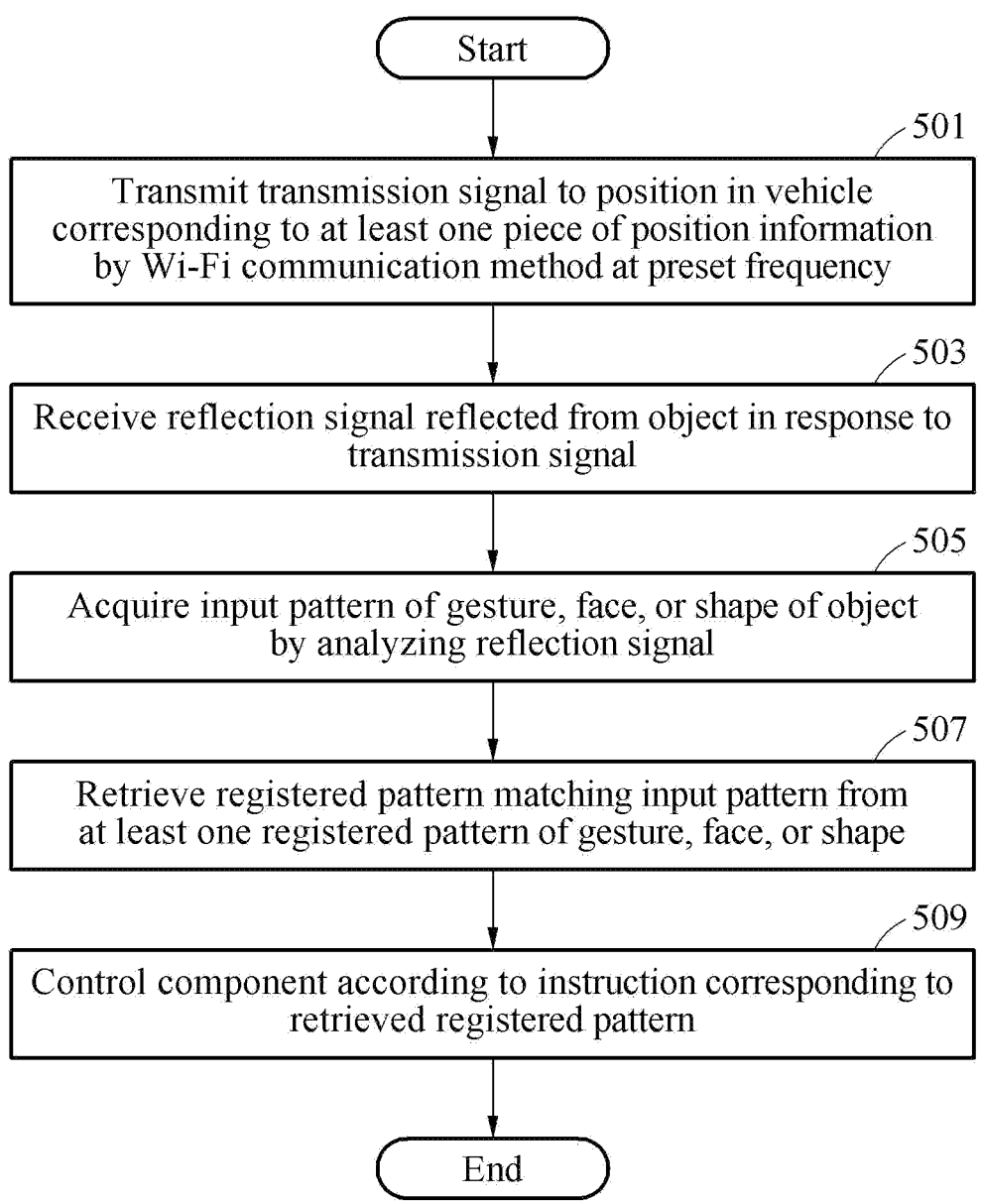

APPARATUS AND METHOD FOR CONTROLLING VEHICLE

CROSS-REFERENCE TO RELATED APPLICATIONS

This application is a continuation of U.S. patent application Ser. No. 16/990,206 filed on Aug. 11, 2020, which claims the benefit under 35 USC 119(a) of Korean Patent Application No. 10-2019-0116689 filed on Sep. 23, 2019, in the Korean Intellectual Property Office, the entire disclosures of which are incorporated herein by reference for all purposes.

BACKGROUND

1. Field

The following description relates to technology that controls a vehicle through gestures.

2. Description of Related Art

Vehicles combined with IT technology provide improved convenience. Accordingly, with the advent of a new market for such vehicles that are completely different from existing vehicles, drivers can drive very safely and comfortably with a smaller effort. For example, BMW has exhibited an electric convertible vehicle called the BMW i Vision Future Interaction that is based on the BMW i8 Concept Spyder model and includes Air Touch, which is a three-dimensional (3D) gesture recognition function that eliminates the need to directly touch a touch screen mounted in the vehicle, and recognizes hand movements to perform actions. Volkswagen's BUDD-e also has a gesture control function, and is provided with volume and display control functions as well as a gesture-based door opening/closing function.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a control apparatus includes a Wi-Fi communication module; a processor; a controller configured to control a component of a vehicle; and a memory, wherein the memory is configured to store at least one piece of position information corresponding to a position in the vehicle, and at least one registered pattern of a gesture, face, or shape, the Wi-Fi communication module is configured to transmit a transmission signal to the position corresponding to the at least one piece of position information by a Wi-Fi communication method at a preset frequency, and receive a reflection signal reflected from an object in response to the transmission signal, the processor is configured to acquire an input pattern of a gesture, face, or shape of the object by analyzing the reflection signal, and retrieve a registered pattern matching the input pattern from the at least one registered pattern of the gesture, face, or shape, and the controller is configured to control the component of the vehicle according to an instruction corresponding to the retrieved registered pattern.

The Wi-Fi communication module may be further configured to form the transmission signal by a beamforming method using a plurality of antennas.

The Wi-Fi communication module may be further configured to form the reflection signal by a beamforming method using a plurality of antennas.

The Wi-Fi communication module may be further configured to set a resolution, and form the transmission signal and the reflection signal by a beamforming method according to the resolution, and the processor may be further configured to acquire the input pattern of the gesture, face, or shape of the object by analyzing the reflection signal according to the resolution.

The control apparatus may further include any one or any combination of any two or more of a light intensity sensor configured to detect a light intensity and output a light intensity signal; a motion sensor configured to sense a motion and output a motion sensing signal; an infrared sensor configured to detect infrared light and output an infrared light signal; and a camera configured to capture an image and output an image signal, wherein the processor may be further configured to acquire the input pattern of the gesture, face, or shape of the object by analyzing the reflection signal received by the Wi-Fi communication module, and any one or any combination of any two or more of the light intensity signal, the motion sensing signal, the infrared light signal, and the image signal.

In response to the position information corresponding to a driver's seat, the instruction may be an instruction of a driving function-related component of the vehicle, or an instruction of a convenience function-related component of the vehicle.

In response to the position information not corresponding to a driver's seat, the instruction may be an instruction of a convenience function-related component of the vehicle.

The Wi-Fi communication module may be further configured to transmit the transmission signal using a frequency of 26 GHz, 38 GHz, 60 GHz, 79 GHz, 94 GHz, or 140 GHz.

In another general aspect, a control method includes transmitting, by a Wi-Fi communication module, a transmission signal to a position in a vehicle corresponding to at least one piece of position information by a Wi-Fi communication method at a preset frequency; receiving, by the Wi-Fi communication module, a reflection signal reflected from an object in response to the transmission signal; acquiring, by a processor, an input pattern of a gesture, face, or shape of the object by analyzing the reflection signal; retrieving, by the processor, a registered pattern matching the input pattern from at least one registered pattern of a gesture, face, or shape; and controlling, by a controller, a component of the vehicle according to an instruction corresponding to the retrieved registered pattern.

The control method may further include forming the transmission signal by a beamforming method using a plurality of antennas.

The control method may further include forming the reflection signal by a beamforming method using a plurality of antennas.

The control method may further include setting a resolution; and forming the transmission signal and the reflection signal by a beamforming method according to the resolution, wherein the acquiring may include acquiring the input pattern of the gesture, face, or shape of the object by analyzing the reflection signal according to the resolution.

The acquiring may include acquiring the input pattern of the gesture, face, or shape of the object by analyzing the reflection signal received by the Wi-Fi communication module, and any one or any combination of any two or more of a light intensity signal output by a light intensity sensor, a motion sensing signal output by a motion sensor, an infrared light signal output by an infrared sensor, and an image signal output by a camera.

In response to the position information corresponding to a driver's seat, the instruction may be an instruction of a driving function-related component of the vehicle, or an instruction of a convenience function-related component of the vehicle.

In response to the position information not corresponding to a driver's seat, the instruction may be an instruction of a convenience function-related component of the vehicle.

The preset frequency may be 26 GHz, 38 GHz, 60 GHz, 79 GHz, 94 GHz, or 140 GHz.

In another general aspect, a non-transitory computer-readable medium stores instructions that, when executed by a processor, cause the processor to perform the method described above.

In another general aspect, a control apparatus includes a Wi-Fi communication module; a processor; and a controller configured to control a component of a vehicle, wherein the Wi-Fi communication module is configured to transmit a transmission signal toward a seat in the vehicle by a Wi-Fi communication method at a preset frequency, and receive a reflection signal reflected from a passenger sitting in the seat in response to the transmission signal, the processor is configured to determine a condition or a motion of the passenger based on the reflection signal, and the controller is configured to control the component of the vehicle according to an instruction corresponding to the determined condition or motion of the passenger.

The control apparatus may further include a memory configured to store position information corresponding to a position of the seat in the vehicle, and a plurality of registered patterns respectively corresponding to different conditions or motions of passengers, wherein the Wi-Fi communication module may be further configured to transmit the transmission signal to the position corresponding to the position information, and the processor may be further configured to acquire an input pattern corresponding to the condition or motion of the passenger by analyzing the reflection signal, retrieve a registered pattern matching the input pattern from the registered patterns, and determine the condition or motion of the passenger to be the condition or motion corresponding to the retrieved registered pattern.

The instruction may depend on whether the seat is a driver's seat, a front passenger seat, or a back seat.

Other features and aspects will be apparent from the following detailed description, the drawings, and the claims.

BRIEF DESCRIPTION OF THE DRAWINGS

FIG. 5 is a diagram showing an example of a control method for controlling a vehicle.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
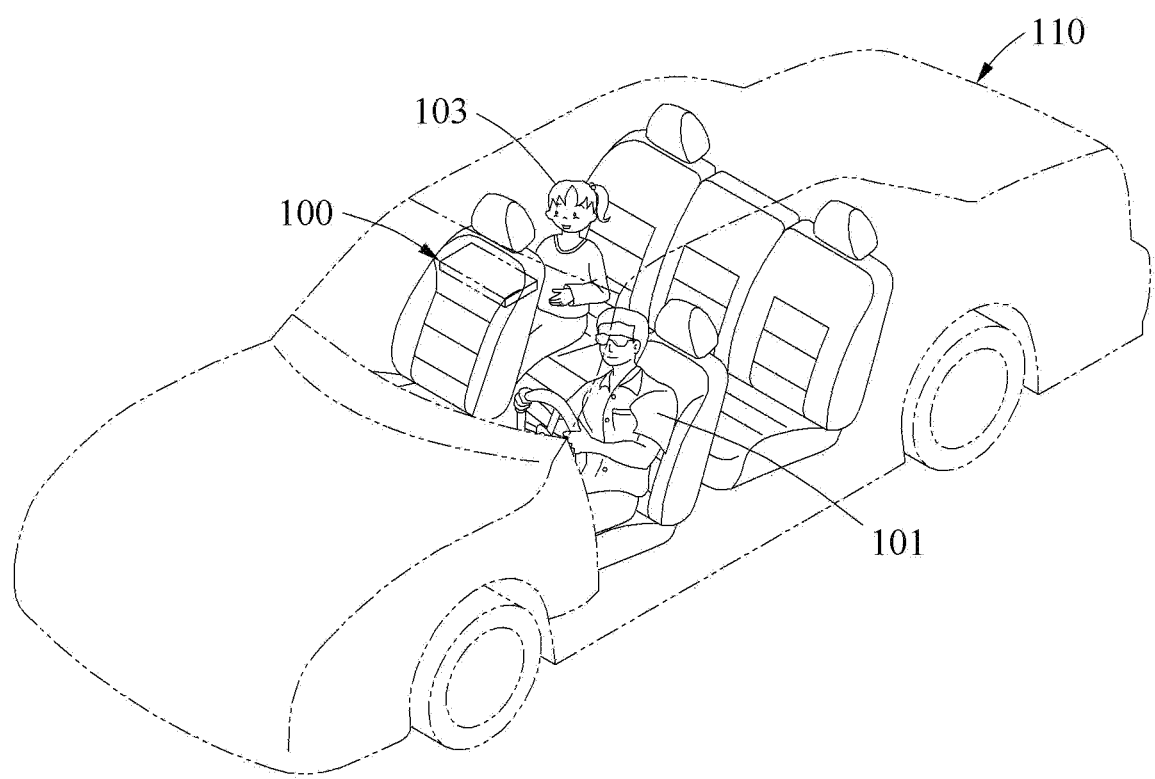
FIG. 1 is a diagram showing an example of a vehicle controlled by a control apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

When an element is described as being "connected to" or "coupled to" another element, it may be directly "connected to" or "coupled to" the other element, or there may be one or more other elements intervening elements therebetween. In contrast, when an element is described as being "directly connected to" or "directly coupled to" another element, there can be no other elements intervening therebetween.

The terminology used herein is for describing various examples only, and is not to be used to limit the disclosure. The term "and/or" includes any one and any combination of any two or more of the associated listed items. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, operations, elements, and/or combinations thereof.

Unless otherwise defined, all terms, including technical and scientific terms, used herein have the same meaning as commonly understood by one of ordinary skill in the art to which the disclosure of this application pertains based on an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

FIG. 1 is a diagram showing an example of a vehicle controlled by a control apparatus.

A control apparatus 100 may detect a condition or motion of a passenger in a vehicle 110, and perform a predefined function in response to the detected condition or motion. The control apparatus 100 may detect the condition or motion of the passenger using a communication module for data communication and various types of sensors. The control apparatus 100 may perform different types of functions in response to a result of recognizing the passenger's condition or motion according to the position of the passenger. Hereinafter, the passenger may be referred to as an object. The object may be a human or an animal.

The control apparatus 100 may support communication of a local area wireless terminal within the vehicle using a Wi-Fi communication module, and at the same time, may detect and recognize the passenger's condition or motion using a transmission signal of the Wi-Fi communication module. The control apparatus 100 may emit the transmission signal to the object in the vehicle, and receive a reflection signal reflected from the object. The control apparatus 100 may analyze the reflection signal, and recognize the object's condition or motion according to whether the reflection signal matches a pre-registered pattern. The control apparatus 100 may emit a focused beam to a specific position of each seat through the Wi-Fi communication module, acquire an input pattern by analyzing the reflection signal, and determine if a passenger is sitting in the corresponding seat and the type of the passenger, for example, a human, an animal, or a child. The control apparatus 100 may recognize a facial expression or a motion pattern from the input pattern. The control apparatus 100 may execute an instruction corresponding to the matched pattern. The instruction may correspond to a function of performing a specific operation of a specific component of the vehicle.

The control apparatus 100 may implement a Wi-Fi hotspot function, gesture sensing, and passenger monitoring through the Wi-Fi communication module and various types of sensors. The Wi-Fi hotspot function is a function of providing a Wi-Fi communication service, and a wireless access point (AP) that provides the Wi-Fi hotspot function transmits and receives a Wi-Fi signal. The control apparatus 100 may serve as a wireless AP, and perform Wi-Fi communication through a separate wireless AP such as a router within the vehicle. The control apparatus 100 may provide the passenger with services that allow the passenger to use ultra-high-speed Internet and various types of content by accessing a wireless local area network (WLAN) through a wireless communication terminal such as a smartphone or a laptop computer.

The gesture sensing and passenger monitoring may be implemented through the Wi-Fi communication module and various types of sensors. The Wi-Fi communication module may shape the transmission signal or the reflection signal through a beamforming technique. For example, the Wi-Fi communication module may use a Wi-Fi communication module that supports 5G. 5G supports Enhanced Mobile Broadband (eMBB), Ultra-Reliable Low Latency Communications (URLLC), and Massive Machine Type Communications (mMTC) services based on technical standards having improved performance. The 802.11ay standard for Wi-Fi communication in 5G may provide data processing functions at the rate of 10 gigabits per second or more with a minimum power consumption by using a 60 GHz millimeter wave (mmWave) band. A unit antenna of the communication module for wireless communication in 5G is as small as 1 cm or less in size to conform to the millimeter wave band, and the output power of the unit antenna is not very high, so a transmission and reception system is built implemented by an array antenna. The array antenna may perform a hybrid beamforming function with a phase shifter and an attenuator.

The control apparatus 100 may detect an obstacle using a frequency set based on a Wi-Fi communication method. For example, the control apparatus 100 may use communication methods such as frequency modulation, phase modulation, orthogonal frequency-division multiplexing (OFDM), pulse modulation, step-pulse modulation, and code-division multiple access (CDMA). For example, the communication module may use a frequency of 60 GHz. However, this example is provided for illustration only, and frequencies of all radio-frequency (RF) signals used in data communication, for example, 26 GHz, 38 GHz, 60 GHz, 79 GHz, 94 GHz, and 140 GHz, may be used. The Wi-Fi communication module may detect the obstacle using the beamforming technique of a plurality of internal antennas. The beamforming may be also known as beam focusing. The control apparatus 100 may form a beam by applying an analog or digital beamforming technique to the transmission signal or the reflection signal.

The control apparatus 100 may accurately determine the position of the passenger and recognize the passenger's facial expression or motion by analyzing the reflection signal reflected from the passenger. The reflection signal reflected by beamforming may be processed to obtain pixels having an angular resolution. For example, an angular resolution of each pixel may be 3° and a matrix of 6×6 pixels may represent an input pattern, resulting in a field of view (FoV) of 18°×18°. As such, the control apparatus 100 may determine whether the object in each seat is a human, an animal, or a child, and recognize the motion or face more precisely.

The control apparatus 100 may perform gesture sensing and passenger monitoring using various types of sensors, for example, any one or any combination of any two or more of a light intensity sensor configured to detect a light intensity and output a light intensity signal, a motion sensor configured to sense a motion and output a motion sensing signal, an infrared (IR) sensor configured to detect infrared light and output an infrared light signal, and a camera configured to capture an image and output an image signal. The sensors may be included in the control apparatus 100, and/or may be installed outside the control apparatus 100. The control apparatus 100 and the sensors may be placed in a center fascia between the driver's seat and the front passenger seat in the vehicle, a rear-view mirror, or a ceiling of the vehicles. However, these examples are provided for illustration only, and the control apparatus 100 and the sensors may be placed at various other locations, and other types of sensors may be used.

The control apparatus 100 may prevent gaze dispersion of a driver 101 and increase safety through gesture sensing. The control apparatus 100 may perform a specific function by recognizing a hand shape of the driver 101 three-dimensionally. The control apparatus 100 may perform various functions by recognizing the hand shape as well as a hand movement pattern. For example, the control apparatus 100 may recognize a motion of moving the palm from right to left, and load information displayed on a multimedia device (Audio/Video/Navigation) (AVN) of the vehicle into a database. For example, the control apparatus 100 may increase the volume of the multimedia device in response to a motion of rotating an index finger in a clockwise direction, and decrease the volume in response to a motion of rotating the index finger in a counterclockwise direction. Also, the control apparatus 100 may recognize the driver's gesture, and perform a function related to driving. For example, the control apparatus 100 may turn on or off a self-driving mode, or turn on or off a left or right turn signal.

The control apparatus 100 may increase the passenger's convenience by monitoring the passenger in the vehicle. The control apparatus 100 may monitor the presence or absence of a person and the person's condition using a pressure sensor installed in the seat and a camera or an IR sensor directed toward the headrest in the seat. The control apparatus 100 may recognize the passenger's facial expression, motion, or gesture, and determine the passenger's condition or a desired function based on the passenger's facial expression, motion, or gesture. For example, the control apparatus 100 may analyze the emotion of a child 103 in the back seat based on the child's facial expression and gesture, and when the control apparatus 100 determines that the child is feeling bored, the control apparatus 100 may display an animated video suitable for the child 103. For example, the control apparatus 100 may analyze an input pattern of a gesture of the passenger, retrieve an instruction matching the input pattern, for example, an instruction to turn on an air conditioner, and turn on the air conditioner in response to the instruction.

The control apparatus 100 may pre-register identification information of the passenger. The identification information may include unique information of the passenger, such as biometric information of the passenger. The control apparatus 100 may personalize the components of the vehicle based on the identification information of the passenger. For example, the control apparatus 100 may personalize the components for the passenger's unique taste, such as a height and a tilt of a seat, a temperature adjusted by a seat heating function, an extent to which windows are opened or closed, content outputted from a multimedia device, or a lighting intensity. The control apparatus 100 may recognize several passengers in the vehicle, and provide a music or movie customized or each passenger by setting audio or content according to the taste of each passenger without disturbing the next passenger.

Figure 2:
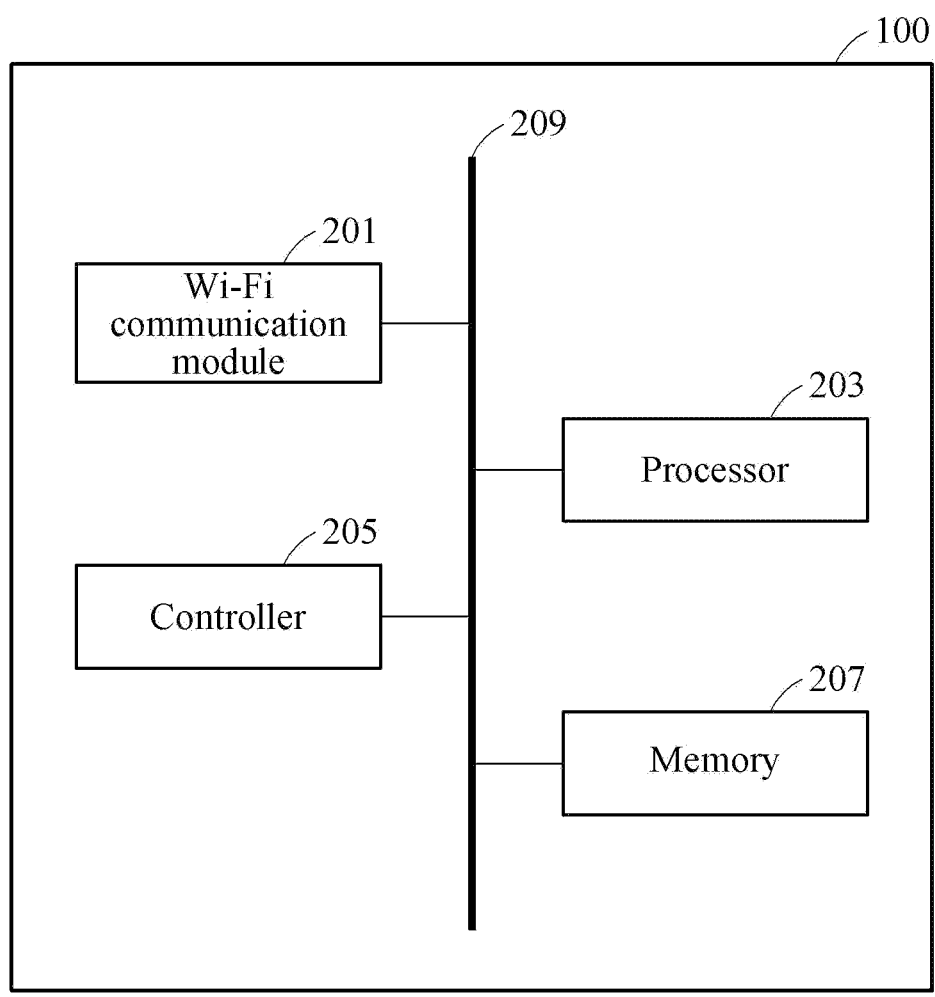
FIG. 2 is a diagram showing an example of a configuration of a control apparatus for controlling a vehicle.

FIG. 2 is a diagram showing an example of a configuration of a control apparatus for a vehicle.

The control apparatus 100 includes a Wi-Fi communication module 201, a processor 203, a controller 205 that controls the components of a vehicle, a memory 207, and a bus 209 to which the Wi-Fi communication module 201, the processor 203, the controller 205, and the memory 207 are connected. The memory 207 stores at least one piece of position information corresponding to a position in the vehicle, and at least one registered pattern of a gesture, face, or shape. In another example, the controller 205 may be placed outside the control apparatus 100. For example, the controller 205 may be included in an apparatus for controlling the vehicle. In this case, the controller 205 may be connected to the control apparatus 100 via wired or wireless communication.

The memory 207 may also store instructions that, when executed by the processor 203, cause the processor 203 to perform the operations described in this application. Alternatively, the processor 203 may include an internal memory (not shown) that may store instructions that, when executed by the processor 203, may cause the processor 203 to perform the operations described in this application. However, these examples are provided for illustration only, and other methods of providing the instructions may be used.

The Wi-Fi communication module 201 transmits a transmission signal to the position corresponding to at least one piece of position information by a Wi-Fi communication method at a preset frequency. The Wi-Fi communication module 201 may transmit a transmission signal formed by a beamforming method using a plurality of antennas to the position corresponding to the at least one piece of position information. The Wi-Fi communication module 201 may transmit the transmission signal using a frequency of 26 GHz, 38 GHz, 60 GHz, 79 GHz, 94 GHz, or 140 GHz. However, these examples are provided for illustration only, and frequencies of all radio-frequency (RF) signals used in data communication may be used.

The Wi-Fi communication module 201 receives a reflection signal reflected from an object in response to the transmission signal. The Wi-Fi communication module 201 may receive a reflection signal formed by a beamforming method using a plurality of antennas. The processor 203 acquires an input pattern of a gesture, face, or shape of the object by analyzing the reflection signal, and retrieves a registered pattern matching the input pattern from the at least one registered pattern of a gesture, face, or shape stored in the memory 207. The processor 203 may train a neural network based on a plurality of input patterns of a registered object, and recognize the registered object through an input pattern currently being inputted using the trained neural network.

The Wi-Fi communication module 201 may form the transmission signal and the reflection signal using a beamforming method depending on a resolution of the transmission signal and the reflection signal. Like visible light, the transmission signal is an electromagnetic wave, and the transmission signal and the reflection signal may have a predetermined resolution. The processor 203 may preset a resolution, and the Wi-Fi communication module 201 may change the beamforming method according to the resolution. The processor 203 may acquire the input pattern of a gesture, face, or shape of the object by analyzing the reflection signal according to the resolution. The processor 203 may analyze the input pattern more precisely by setting the resolution higher. For example, the processor 203 may analyze the facial expression of a passenger in the back seat, determine an emotional or physical condition of the passenger based on the analysis result, and perform a corresponding function based on the determination result.

The control apparatus 100 may further include any one or any combination of any two or more of a light intensity sensor configured to detect a light intensity and output a light intensity signal, a motion sensor configured to sense a motion and output a motion sensing signal, an infrared (IR) sensor configured to detect infrared light and output an infrared light signal, and a camera configured to capture an image and output an image signal. The processor 203 acquires the input pattern of a gesture, face, or shape of the object by analyzing the reflection signal received by the Wi-Fi communication module 201, and any one or any combination of any two or more of the light intensity signal, the motion sensing signal, the infrared light signal, and the image signal. The processor 203 may analyze the input pattern using the trained neural network, and perform a function matching the input pattern. As described above, using various types of sensors together with the Wi-Fi communication module 201, the control apparatus 100 may determine a motion, condition, or shape of the passenger more accurately, and perform a function intended by the passenger.

The controller 205 controls a component of the vehicle according to an instruction corresponding to the retrieved registered pattern. When the position information corresponds to the driver's seat, the instruction may be an instruction of a driving function-related component of the vehicle, or an instruction of a convenience function-related component of the vehicle. When the position information does not correspond to the driver's seat, the instruction may be an instruction of a convenience function-related component of the vehicle. However, these examples of functions and classifications are provided for illustration only, and instructions that may be controlled for each seat are not limited thereto.

Figure 3:
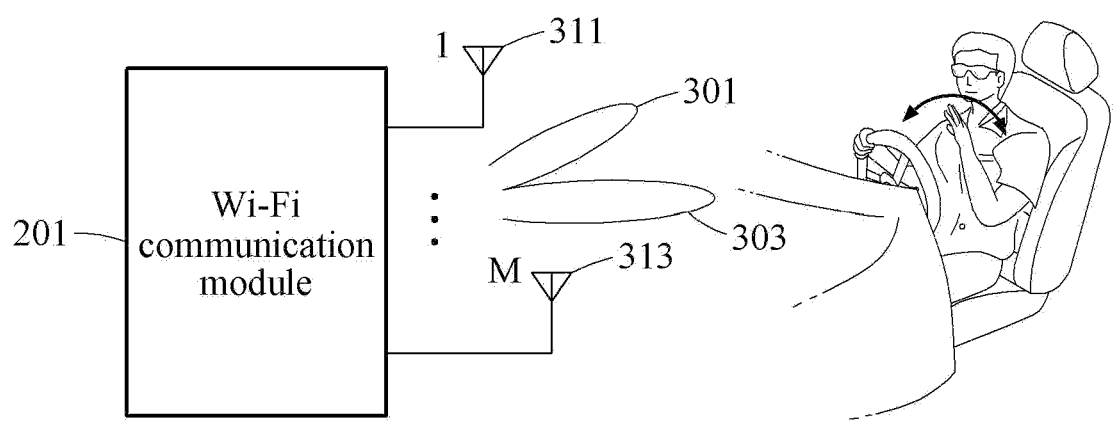
FIG. 3 is a diagram showing an example of a user's gesture pattern being acquired using a transmission signal formed by a beamforming technique from a Wi-Fi communication module.

FIG. 3 is a diagram showing an example of a user's gesture pattern being acquired using a transmission signal formed by a beamforming technique from a Wi-Fi communication module.

The beamforming technique is a technique that provides directivity to the transmission signal or the reflection signal. The Wi-Fi communication module 201 may control the antenna to emit the transmission signal in a specific direction, or receive the reflection signal from a specific direction. The Wi-Fi communication module 201 may form a beam directed toward a specific direction by controlling a plurality of antennas such as an array antenna. In regard to creating signal directivity in a specific direction, the beamforming technique performs spatial filtering. Additionally, in regard to transmitting multiple signals over a spatial channel, the beamforming technique performs spatial multiplexing.

Referring to FIG. 3, the Wi-Fi communication module 201 may include a plurality of antennas 311, 313. For example, the plurality of antennas 311, 313 may be an array antenna. For example, the plurality of antennas 311, 313 may be a linear array antenna, a planar array antenna, a non-planar array antenna, a fixed array antenna and a phased array antenna. However, these examples are provided for illustration only, and various other types of antennas may be used.

The Wi-Fi communication module 201 may variously change the direction to which the transmission signal or the reflection signal is directed depending on the beamforming direction. The Wi-Fi communication module 201 may control the direction of the transmission signal or the reflection signal according to the seats in the vehicle. For example, in the case of the driver's seat, a transmission signal 303 may be emitted to the position of the steering wheel or the gear knob. For example, in the case of the front passenger seat or the back seat, a transmission signal 301 may be emitted to the position of the headrest at the back of the passenger's head. However, these examples are provided for illustration only, and the transmission signal may be emitted to various other positions.

Figure 4:
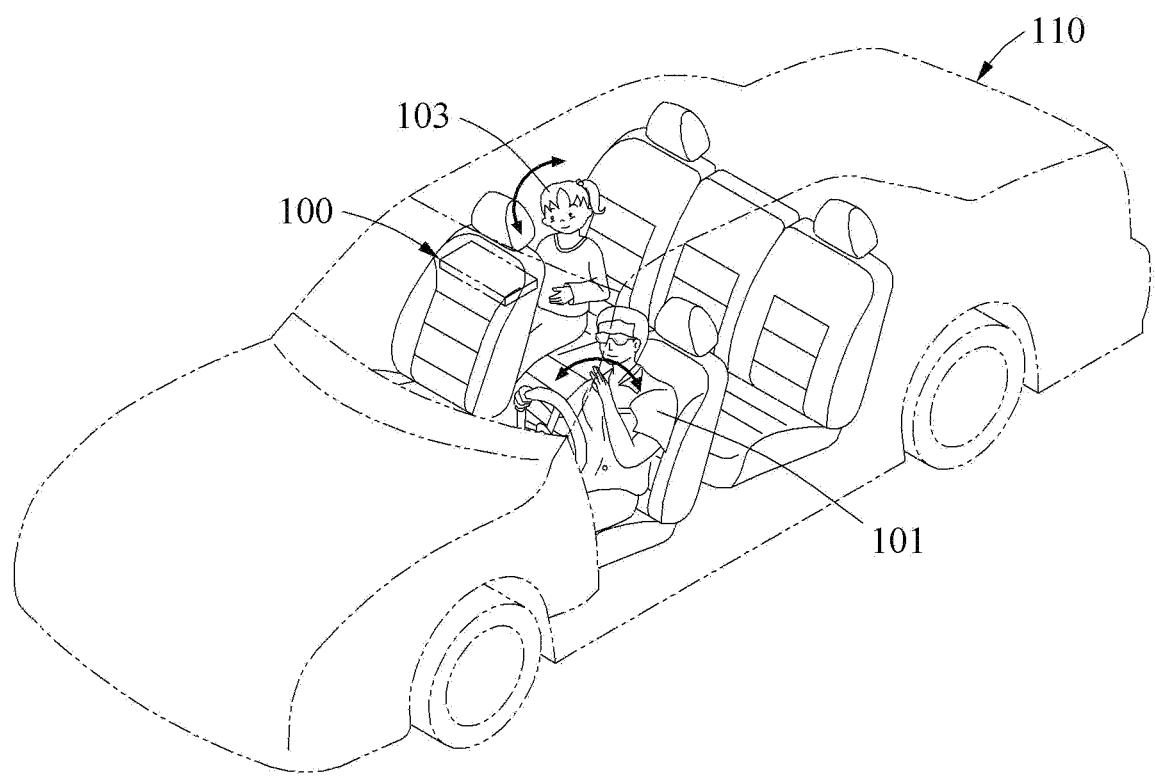
FIG. 4 is a diagram showing examples of different vehicle functions controlled by a control apparatus depending on different seats in a vehicle.

FIG. 4 is a diagram showing different vehicle functions controlled by a control apparatus depending on different seats in a vehicle.

Referring to FIG. 4, the vehicle 110 may include the control apparatus 100. The control apparatus 100 may be placed near a rear-view mirror of the vehicle or at a center of a ceiling of the vehicle. The Wi-Fi communication module 201 may be included in the control apparatus 100, and a plurality of Wi-Fi communication modules 201 may be installed outside the control apparatus 100 to cover all of the seats. In the latter case, the control apparatus 100 may communicate with the Wi-Fi communication module 201 via wired or wireless communication.

The control apparatus 100 may perform different functions depending on the seat type or position determined by analyzing the reflection signal. The control apparatus 100 may execute different types of instructions depending on the seats. When the position information corresponds to the driver's seat, the instruction may be an instruction of a driving function-related component of the vehicle, or an instruction of a convenience function-related component of the vehicle. For example, when the position corresponds to the driver's seat for the driver 101, the controller 205 may perform a main function for driving such as execution of a self-driving mode, a change of speed, shifting of a manual or automatic transmission, acceleration or deceleration, an emergency stop, and a change of direction, as well as an auxiliary function such as turning on or off a turn signal, turning on or off a headlight, adjusting a mirror position, turning on or off an emergency light, and turning on or off a windshield wiper. When the position information does not correspond to the driver's seat, the instruction may be an instruction of a convenience function-related component of the vehicle. When the position information corresponds to the front passenger seat or the back seat, for example, when the position information corresponds to the back seat in which the passenger 103 is sitting, the controller 205 may control a convenience-related function such as a lighting intensity, an extent to which windows are open or closed, a seat angle and position, manipulation of a multimedia device, a temperature and cooling level of an air conditioner, a seat heating function, a speaker output, and a choice of content outputted from the speaker. However, these examples of functions and classifications are provided for illustration only, and instructions that may be controlled for each seat are not limited thereto.

FIG. 5 is a diagram showing an example of a control method for controlling a vehicle.

In operation 501, the Wi-Fi communication module 201 may transmit a transmission signal to a position in the vehicle corresponding to at least one piece of position information by a Wi-Fi communication method at a preset frequency. The Wi-Fi communication module 201 may transmit a transmission signal formed by a beamforming method using a plurality of antennas to the position corresponding to the at least one piece of position information. The Wi-Fi communication module 201 may transmit the transmission signal, for example, using a frequency of 26 GHz, 38 GHz, 60 GHz, 79 GHz, 94 GHz, or 140 GHz.

In operation 503, the Wi-Fi communication module 201 may receive a reflection signal reflected from an object in response to the transmission signal. The Wi-Fi communication module 201 may receive a reflection signal formed by a beamforming method using a plurality of antennas.

The Wi-Fi communication module 201 may form the transmission signal using a beamforming method according to a resolution set by the Wi-Fi communication module 201. The Wi-Fi communication module 201 may form the reflection signal using the beamforming method according to the resolution.

The control apparatus 100 may acquire an input pattern of a gesture, face, or shape of the object by analyzing the reflection signal according to the resolution. The control apparatus 100 may acquire the input pattern of the gesture, face, or shape of the object by analyzing the reflection signal received by the Wi-Fi communication module 201, and any one or any combination of any two or more of the light intensity signal, the motion sensing signal, the infrared light signal, and the image signal.

In operation 505, the control apparatus 100 may acquire, by the processor, the input pattern of the gesture, face, or shape of the object by analyzing the reflection signal.

In operation 507, the control apparatus 100 may retrieve, by the processor, a registered pattern matching the input pattern from at least one registered pattern of a gesture, face, or shape.

In operation 509, the control apparatus 100 may control, by the controller, a component according to an instruction corresponding to the retrieved registered pattern.

When the position information corresponds to the driver's seat, the instruction may be an instruction of a driving function-related component of the vehicle, or an instruction of a convenience function-related component of the vehicle. When the position information does not correspond to the driver's seat, the instruction may be an instruction of a convenience function-related component of the vehicle.

The Wi-Fi communication module 201, the processor 203, the controller 205, and the memory in FIG. 2 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, radios, antennas, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 5 that performs the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A control apparatus comprising:
a Wi-Fi communication module;
a processor;
a controller configured to control a component of a vehicle; and
a memory,
wherein the memory stores at least one piece of position information corresponding to a position in the vehicle, and at least one registered pattern of a gesture or a registration condition,
the Wi-Fi communication module is configured to transmit a transmission signal to the position corresponding to the at least one piece of position information according to a Wi-Fi communication protocol at a preset frequency, and receive a reflection signal reflected from an object in response to the transmission signal,
the processor is configured to acquire an input pattern of a gesture or a condition of the object by analyzing the reflection signal, and retrieve a registered pattern matching the input pattern from the at least one registered pattern, and
the controller is configured to control the component of the vehicle according to an instruction corresponding to the retrieved registered pattern,
wherein in response to the position information corresponding to a seat in the vehicle, the instruction is selected from a group including an instruction of a driving function-related component of the vehicle, and/or an instruction of a convenience function-related component of the vehicle.

2. The control apparatus of claim 1, wherein the seat in the vehicle comprises:
a driver's seat, and
a passenger seat.

3. The control apparatus of claim 1, wherein in response to the position information corresponding to a driver's seat, the instruction is an instruction of a driving function-related component of the vehicle, and/or an instruction of a convenience function-related component of the vehicle.

4. The control apparatus of claim 1, wherein
in response to the position information corresponding to a passenger seat, the instruction is an instruction of a convenience function-related component of the vehicle.

5. The control apparatus of claim 1,
wherein the Wi-Fi communication module is further configured to form the transmission signal through beamforminq using a plurality of antennas.

6. The control apparatus of claim 1, wherein the Wi-Fi communication module is further configured to form the reflection signal through beamforming using a plurality of antennas.

7. The control apparatus of claim 1, wherein the Wi-Fi communication module is further configured to set a resolution, and form the transmission signal and the reflection signal through beamforming according to the resolution, and
the processor is further configured to acquire the input pattern by analyzing the reflection signal according to the resolution.

8. The control apparatus of claim 1, further comprising any one or any combination of any two or more of:
a light intensity sensor configured to detect a light intensity and output a light intensity signal;
a motion sensor configured to sense a motion and output a motion sensing signal;
an infrared sensor configured to detect infrared light and output an infrared light signal; and
a camera configured to capture an image and output an image signal,
wherein the processor is further configured to acquire the input pattern by analyzing the reflection signal received by the Wi-Fi communication module, and any one or any combination of any two or more of the light intensity signal, the motion sensing signal, the infrared light signal, and the image signal.

9. A control method comprising:
transmitting, by a Wi-Fi communication module, a transmission signal to a position in a vehicle corresponding to at least one piece of position information according to a Wi-Fi communication protocol at a preset frequency;
receiving, by the Wi-Fi communication module, a reflection signal reflected from an object in response to the transmission signal;
acquiring, by a processor, an input pattern of a gesture or a condition of the object by analyzing the reflection signal;
retrieving, by the processor, a registered pattern matching the input pattern from at least one registered pattern of a registration gesture or a registration condition; and
controlling, by a controller, a component of the vehicle according to an instruction corresponding to the retrieved registered pattern,
wherein in response to the position information not corresponding to a seat in the vehicle, the instruction is an instruction of a convenience function-related component of the vehicle.

10. The control method of claim 9, wherein the seat in the vehicle comprises:
a driver's seat, and
a passenger seat.

11. The control method of claim 9, wherein in response to the position information corresponding to a driver's seat, the instruction is an instruction of a driving function-related component of the vehicle, and/or an instruction of a convenience function-related component of the vehicle.

12. The control method of claim 9,
wherein in response to the position information corresponding to a passenger seat, the instruction is an instruction of a convenience function-related component of the vehicle.

13. The control method of claim 9, further comprising forming the transmission signal through beamforminq using a plurality of antennas.

14. The control method of claim 9, further comprising forming the reflection signal through beamforming using a plurality of antennas.

15. The control method of claim 9, further comprising:
setting a resolution; and
forming the transmission signal and the reflection signal through beamforming according to the resolution,
wherein the acquiring comprises acquiring the input pattern of the object by analyzing the reflection signal according to the resolution.

16. The control method of claim 9, wherein the preset frequency is 26 GHz, 38 GHz, 60 GHz, 79 GHz, 94 GHz, or 140 GHz.

17. A non-transitory computer-readable medium storing instructions that, when executed by a processor, cause the processor to perform the method of claim 9.

18. The control method of claim 9, wherein the acquiring comprises acquiring the input pattern of the object by analyzing the reflection signal received by the Wi-Fi communication module, and any one or any combination of any two or more of a light intensity signal output by a light intensity sensor, a motion sensing signal output by a motion sensor, an infrared light signal output by an infrared sensor, and an image signal output by a camera.

19. The control apparatus of claim 1, wherein in response to the position information not corresponding to a seat in the vehicle, the instruction is an instruction of a convenience function-related component of the vehicle.

20. The control apparatus of claim 1, wherein the Wi-Fi communication module is further configured to transmit the transmission signal using a frequency of 26 GHz, 38 GHz, 60 GHz, 79 GHz, 94 GHz, or 140 GHz.

* * * * *